US009165325B2

(12) United States Patent
Chakravarty et al.

(10) Patent No.: US 9,165,325 B2
(45) Date of Patent: Oct. 20, 2015

(54) SYSTEM AND METHOD FOR DETECTING ANOMALY ASSOCIATED WITH DRIVING OF A VEHICLE

(71) Applicant: Tata Consultancy Services Limited, Maharashtra (IN)

(72) Inventors: Tapas Chakravarty, West Bengal (IN); Avik Ghose, West Bengal (IN); Arijit Chowdhury, West Bengal (IN); Chirabrata Bhaumik, West Bengal (IN); Balamuralidhar Purushothaman, Karnataka (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/327,211

(22) Filed: Jul. 9, 2014

(65) Prior Publication Data
US 2015/0019067 A1    Jan. 15, 2015

(30) Foreign Application Priority Data

Jul. 10, 2013 (IN) .......................... 2326/MUM/2013

(51) Int. Cl.
| | |
|---|---|
| G06Q 40/08 | (2012.01) |
| G07C 5/00 | (2006.01) |
| G07C 5/08 | (2006.01) |
| B60W 40/09 | (2012.01) |
| G05B 23/02 | (2006.01) |

(52) U.S. Cl.
CPC ............... *G06Q 40/08* (2013.01); *B60W 40/09* (2013.01); *G05B 23/0232* (2013.01); *G07C 5/008* (2013.01); *G07C 5/085* (2013.01)

(58) Field of Classification Search
CPC ....... G06Q 40/08; G06Q 10/10; G06Q 5/085; G06Q 5/008
See application file for complete search history.

(56) References Cited

U.S. PATENT DOCUMENTS

| | | | |
|---|---|---|---|
| 2013/0006675 A1 | 1/2013 | Bowne et al. | |
| 2013/0144657 A1* | 6/2013 | Ricci | 705/4 |
| 2013/0289819 A1* | 10/2013 | Hassib et al. | 701/29.6 |

(Continued)

FOREIGN PATENT DOCUMENTS

| | | |
|---|---|---|
| WO | WO/2009/068983 | 6/2009 |
| WO | WO/2013/096908 | 6/2013 |

OTHER PUBLICATIONS

Driving Style Recognition Using a Smartphone as a Sensor Platform, "Derick A. Johnson and Mohan M. Trivedi (Laboratory for Intelligent and Safe Automobiles (LISA) University of California, San Diego)"2011 14th International IEEE Conference on Intelligent Transportation Systems Washington, DC, USA., Oct. 5-7, 2011.

*Primary Examiner* — Rodney Butler
(74) *Attorney, Agent, or Firm* — Thompson Hine LLP

(57) ABSTRACT

Disclosed are a device, system and methods for detecting an anomaly associated with driving of a vehicle. Z-axis acceleration data is determined at the device. Based on the Z-axis acceleration data, jerk energies are computed and transmitted to the system for analysis. Further, the jerk energies are received for a plurality of trips at the system. Further, at the system, statistical analysis is performed on the jerk energies for determining a hazard rate for each trip of the plurality of trips. Then based on the hazard rate determined for each of the plurality of trips, a trend analysis is performed. Based on the trend analysis, any anomaly associated with the driving of the vehicle is detected. Further, the anomaly detected may be notified to a person associated with the device or with a monitoring terminal.

10 Claims, 6 Drawing Sheets

(56) References Cited

U.S. PATENT DOCUMENTS

| | | | |
|---|---|---|---|
| 2014/0143839 A1* | 5/2014 | Ricci | 726/4 |
| 2014/0149145 A1* | 5/2014 | Peng et al. | 705/4 |
| 2014/0343972 A1* | 11/2014 | Fernandes et al. | 705/4 |
| 2015/0046197 A1* | 2/2015 | Peng et al. | 705/4 |

\* cited by examiner

SYSTEM AND METHOD FOR DETECTING ANOMALY ASSOCIATED WITH DRIVING OF A VEHICLE

RELATED APPLICATIONS

This application claims the benefit of Indian patent application No. 2326/MUM/2013, filed Jul. 10, 2013.

TECHNICAL FIELD

The present subject matter described herein, in general, relates to anomaly detection associated with driving of a vehicle.

BACKGROUND

Intelligent transportation systems are considered as the advanced applications that provide novel services relating to traffic management and a convenient use of transport networks. Among a plurality of others, the issue of ensuring driving safety through driving behavior analysis is an important requirement that has received wide attention. As it is clear that the driving safety bears a direct co-relation with the driver's normal and abnormal driving behaviors, many systems for detecting driver's driving behavior have been developed and are widely used. These systems usually include detection of a driver's physiological signal(s), such as the movement of the driver's head, the changes in the driver's heartbeat, the moving track of the steering wheel, the driver's eye movement and the like.

The driving behavior analysis systems may be essentially used for the applications like customized auto-insurance. For such applications, an insurance premium for a driver is based on the driver's normal and abnormal driving behaviors. This behavior is known usage based insurance (UBI) which is a telematics application. As widely understood telematics is a technology relating to the collection of vehicle data as well as driving data and transmitting the data over the telecom network to a central server for further analysis. The purpose of data analysis is to identify a given driving behavior in terms of potential risk induced. The analysis may lead to quantitative figures: for example, driving scores that are used for underwriting. On a different context, such telematics applications may be used to identify safe driving behavior on a daily basis. The application may identify behavior (on a particular trip) with respect to a baseline behavior where the baseline behavior is classified based upon a priori knowledge; often captured as part of blind profiling. Here, traffic psychology forms a particular basis of classifying a driver in terms of potential for driving error.

Conventionally, the driving pattern classification requires the collection of a plurality of sensor data. The minimum set of sensors that may be required for the analysis and classification may include, but are not limited to, accelerometer sensors, gyroscope sensors, vehicle speed capturing sensors, location capturing sensors, weather capturing sensors, etc. Further, to test the risk level due to driving behavior, people have analyzed statistically the historical record of the number of car crashes. Additionally, researchers have computed a threshold value for the aggregated and/or processed data. The threshold value defines a "crash" and the measured values are compared with it to assess the probability of a crash.

The conventional system needs to collect data from a plurality of sensors embedded in a moving vehicle, wherein the sensors may include, but are not limited to, accelerometers, speed, GPS, time, etc. There exists a need to define specifically anomalous behavior like hard stop, harsh acceleration, hard bump, etc. For such analysis, assigning of a threshold value below which the behavior is treated as normal, computing of the total number of such specific violations and calculating of a relative risk is a time consuming process.

In the light of foregoing problems, there exists a need for a system and a method that can provide a one stop solution for driving behavior analysis in order to generate a driving behavior of a driver that can effectively overcome the deficiencies and technical limitations described hereinabove. Further, there also exists a need for a system and a method that can efficiently compute a driving score with minimum requirement of sensors to sense multiple parameters of a moving vehicle.

SUMMARY

This summary is provided to introduce aspects related to systems and methods for driving behavior analysis, and the aspects are further described below in the detailed description. This summary is not intended to identify essential features of the claimed subject matter nor is it intended for use in determining or limiting the scope of the subject matter.

In one implementation, a device for facilitating detection of an anomaly associated with driving of a vehicle during a trip is disclosed. The device includes a processor and a memory coupled to the processor for executing a plurality of modules stored in the memory. The plurality of modules includes an accelerometer module, a computing module, and a transmitting module. The accelerometer module determines Z-axis acceleration data of the vehicle for the trip. The Z-axis acceleration data is indicative of vertical vibrations associated with the vehicle. Further, the computing module is coupled to the accelerometer module to receive the Z-axis acceleration data and compute jerk energies based on the Z-axis acceleration data of the trip. Upon computing the jerk energies, the transmitting module, which is coupled to the computing module, transmits the jerk energies from the computing module to an external system electronically coupled with the device. Further, the jerk energies are being processed by the external system to detect any anomaly in the trip.

In another implementation, a method for facilitating detection of an anomaly associated with driving of a vehicle during a trip is disclosed. The method includes a step of providing a device as disclosed herein, and using this device, specifically the accelerometer module, determining Z-axis acceleration data of the vehicle for the trip. The Z-axis acceleration data is indicative of vertical vibrations associated with the vehicle. The method also includes computing, in a computing module within the device, jerk energies based on the Z-axis acceleration data of the trip. Further, the method includes transmitting, be the transmitting module within the device, the jerk energies to an external system for processing to determine or detect any anomaly in the trip.

In one implementation, a system for detecting an anomaly associated with driving of a vehicle for a plurality of trips is disclosed. The system includes a processor and a memory coupled to the processor for executing a plurality of modules stored in the memory. The plurality of modules include a receiving module, a statistical analysis module, a trend analysis module, and an anomaly detection module. The receiving module is configured to receive jerk energies for a trip of the plurality of trips from a device, where the device is enabled for computing the jerk energies. The statistical analysis module is coupled to the receiving module to receive the jerk energies therefrom and is configured to perform a statistical analysis on the jerk energies. According to an aspect of the present subject matter, the statistical analysis is performed by performing various steps, where one step is obtaining one or more statistical parameters of the jerk energies. The statistical parameters comprise a shape parameter (k) and a scale parameter (λ), where the statistical parameters are conforming to a Weibull distribution. Further, the next step of the statistical analysis is determining a percentile value ($X_{high}$) for the jerk energies. The statistical analysis module is further configured for determining a hazard rate for the trip based upon the statistical analysis i.e., by using one or more statistical parameters and the percentile value. Further, the trend analysis module of the system is coupled to the statistical analysis module to receive the hazard rate for the trip and is configured to perform a trend analysis of the hazard rate of each trip of the plurality of trips. According to aspects of the present subject matter, steps performed by the trend analysis module includes: processing the hazard rate of each trip of the plurality of trips; determining a mean-value, an upper-bound value, and a lower-bound value based on the processing of the hazard rate; and performing the trend analysis based upon the upper-bound value and the lower-bound value of the hazard rate. Thus, upon performing the trend analysis, the anomaly detection module of the system, which is coupled to the trend analysis module, detects any anomaly associated with the driving of the vehicle based on the trend analysis.

In another implementation, a method for detecting an anomaly associated with driving of a vehicle for a plurality of trips is disclosed. The method includes a step of providing a system as disclosed herein, and using this system, specifically the receiving module to receive jerk energies for a trip of the plurality of trips from a device computing the jerk energies. The method also includes performing a statistical analysis on the jerk energies received using the statistical analysis module within the system to determine a hazard rate for the trip based on the statistical analysis. According to aspects of the present subject matter, performing the statistical analysis includes various steps. One step may be obtaining one or more statistical parameters of jerk energies, where the statistical parameters comprise a shape parameter (k) and a scale parameter (λ). The shape parameter (k) and the scale parameter (λ) may conform to a Weibull distribution. Further, another step of the statistical analysis may be determining a percentile value ($X_{high}$) for the jerk energies. The hazard rate is determined by using one or more of these statistical parameters and the percentile value. Further, the method includes a next step of performing a trend analysis of the hazard rate for each trip of the plurality of trips using the trend analysis module of the system. According to aspects of the present subject matter, steps performed by the trend analysis module include: processing the hazard rate of each trip of the plurality of trips; determining a mean-value, an upper-bound value, and a lower-bound value based on the processing of the hazard rate; and performing the trend analysis based upon the upper-bound value and the lower-bound value of the hazard rate. Thereafter, the next step includes detecting any anomaly associated with the driving of the vehicle based on the trend analysis using the anomaly detection module.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for detecting an anomaly associated with the driving of a vehicle for a plurality of trips are described. The purpose of the present subject matter is to effectively and efficiently determine driving behavior of a driver driving the vehicle. For detecting the anomaly in driving behavior, the present subject matter may consider only Z-axis acceleration (vertical vibration) for the vehicle moving on rough road. The anomaly may be measured in terms of "hazard rate per hour (HPH)", where the HPH may be a dimensionless quantity deducted from the Z-axis acceleration measured for the vehicle. Further, the HPH may be computed for each completed trip of a multiple numbers of trips. According to embodiments, the vertical vibration (also referred as Z-axis acceleration data) of the moving vehicle may be measured using at least one of the accelerometer sensors. The accelerometer sensors may be a part of on-board diagnostic equipment or it may be embedded in a Smartphone. According to one embodiment, the on-board diagnostic equipment or the Smartphone may be collectively referred as a "device". Further, the Z-axis acceleration data may be processed by the device for computing jerk energies for each trip. The computed jerk energies may be transmitted over a network to a system (a centralized server) for analysis, wherein a data set may be stored at the system.

Thus, upon receiving the jerk energies computed by the device, the system may be further enabled for performing a statistical analysis of the jerk energies to determine the hazard rate for each of the multiple trips. Further, a trend analysis may be performed for the hazard rate determined for each of the multiple trips. Based on the trend analysis performed, the anomaly associated with the driving of the vehicle may be detected and notified.

While aspects of the described system and method for detecting an anomaly associated with driving of a vehicle may be implemented in any number of different computing systems, environments, and/or configurations, the embodiments are described in the context of the following exemplary system.

Figure 1:
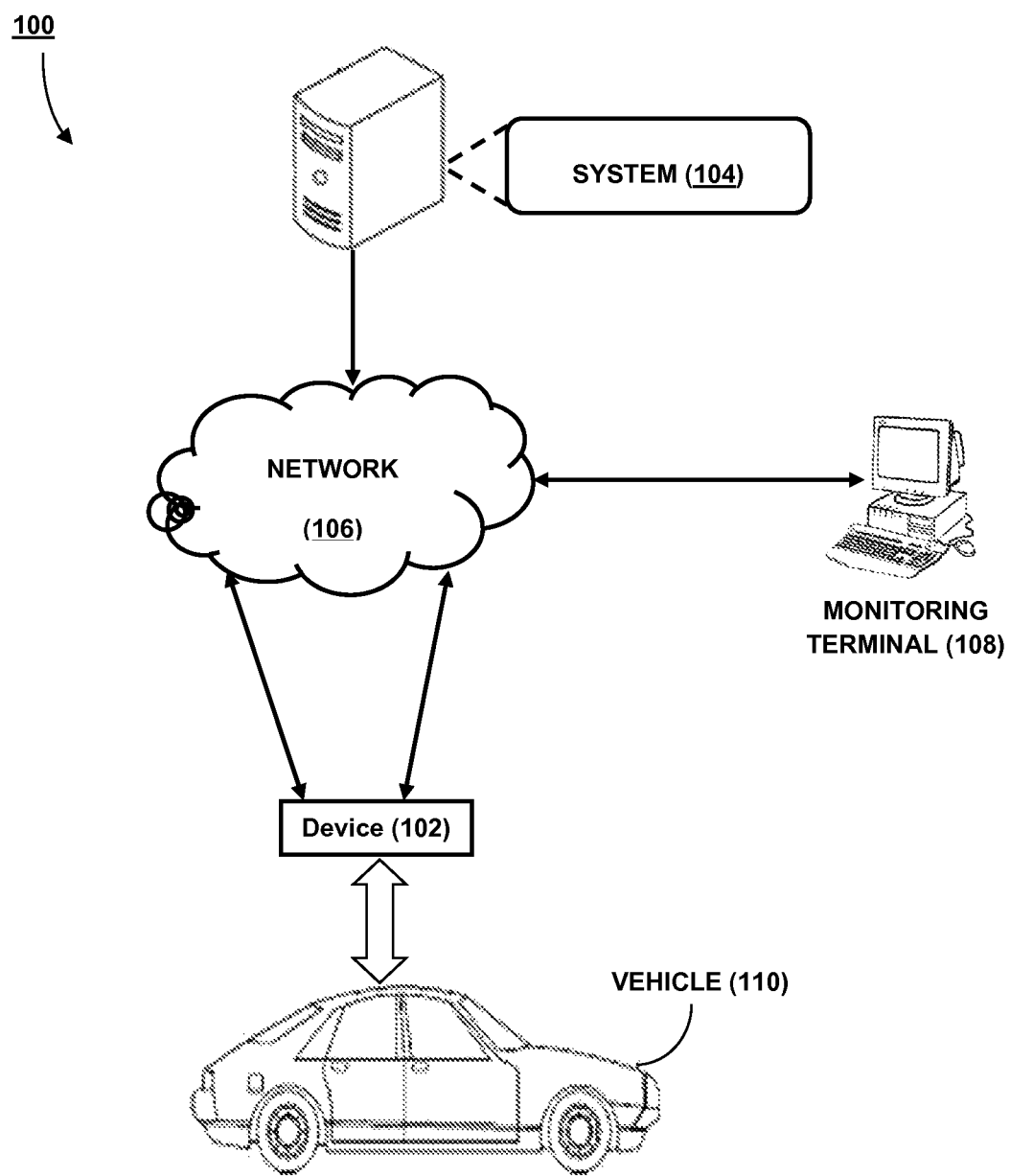
FIG. 1 illustrates a network implementation illustrating communication between a device 102 installed in a vehicle and a system 104 for detecting an anomaly associated with the driving of the vehicle.

Referring now to FIG. 1, one embodiment of a network implementation 100 of a system 104 and a device 102, for detecting anomaly associated with the driving of a vehicle 110 is illustrated. Although the present subject matter is explained considering that the system 104 is implemented on a server, it may be understood that the system 104 may also be implemented in a variety of computing systems, such as a laptop computer, a desktop computer, a notebook, a workstation, a mainframe computer, a server, a network server, and the like. According to an embodiment, the device 102 may be considered as a combination of an accelerometer sensor embedded into on-board diagnostic equipment (ODE), where the ODE may be installed in the vehicle 110. According to another embodiment, the device 102 may be considered as a combination of the accelerometer sensor embedded into a mobile device. Further, the mobile device may be a Smartphone, laptop, notebook, and the like of a person driving the vehicle 110. Yet, according to one embodiment, a monitoring terminal 108 may be a laptop, a computer, a desktop computer, a notebook, a workstation, a mainframe computer, a server, a network server, and the like. The monitoring terminal 108 may be a remotely located terminal used by a person monitoring the driving behavior of another person who may be driving the vehicle 110.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
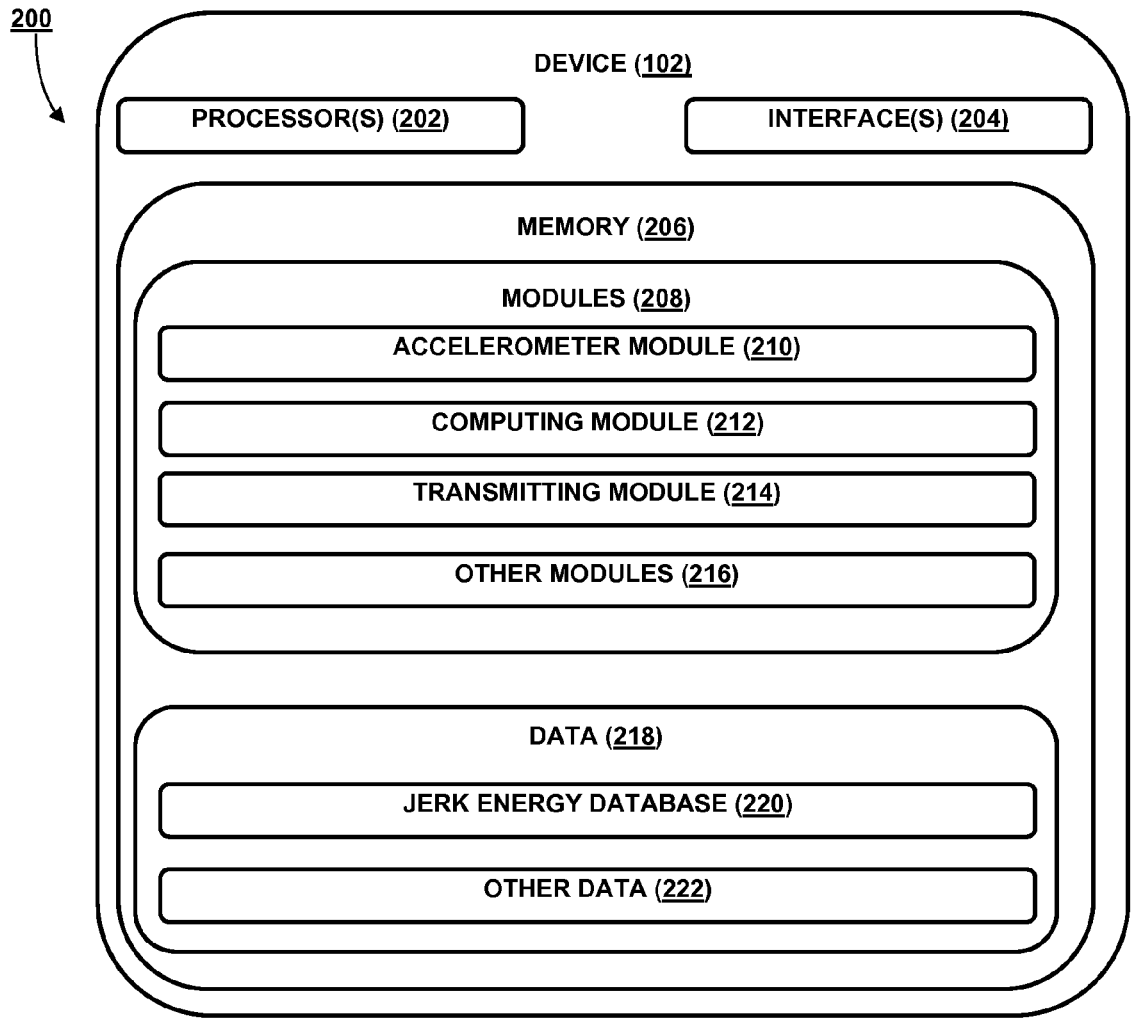
FIG. 2 illustrates one embodiment of the device 102 of FIG. 1.

Referring now to FIG. 2, a device 102 is illustrated in accordance with an embodiment of the present subject matter. In one embodiment, the device 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute programmed instructions stored in the memory 206.

The I/O interface 204 may include a variety of software and hardware interfaces, for example, a web interface, a graphical user interface, and the like. The I/O interface 204 may allow the device 102 to interact with a system 104 and a monitoring terminal 108. Further, the I/O interface 204 may enable the device 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 218.

The modules 208 include routines, programs, objects, components, data structures, etc., which perform particular tasks or implement particular abstract data types. In one implementation, the modules 208 may include an accelerometer module 210, a computing module 212, a transmitting module 214, and other modules 216. The other modules 216 may include programs or coded instructions that supplement applications and functions of the device 102.

The data 218, amongst other things, serves as a repository for storing data processed, received, and generated by one or more of the modules 208. The data 218 may also include a jerk energy database 220, and other data 222. The other data 222 may include data generated as a result of the execution of one or more modules in the other modules 216.

Figure 3:
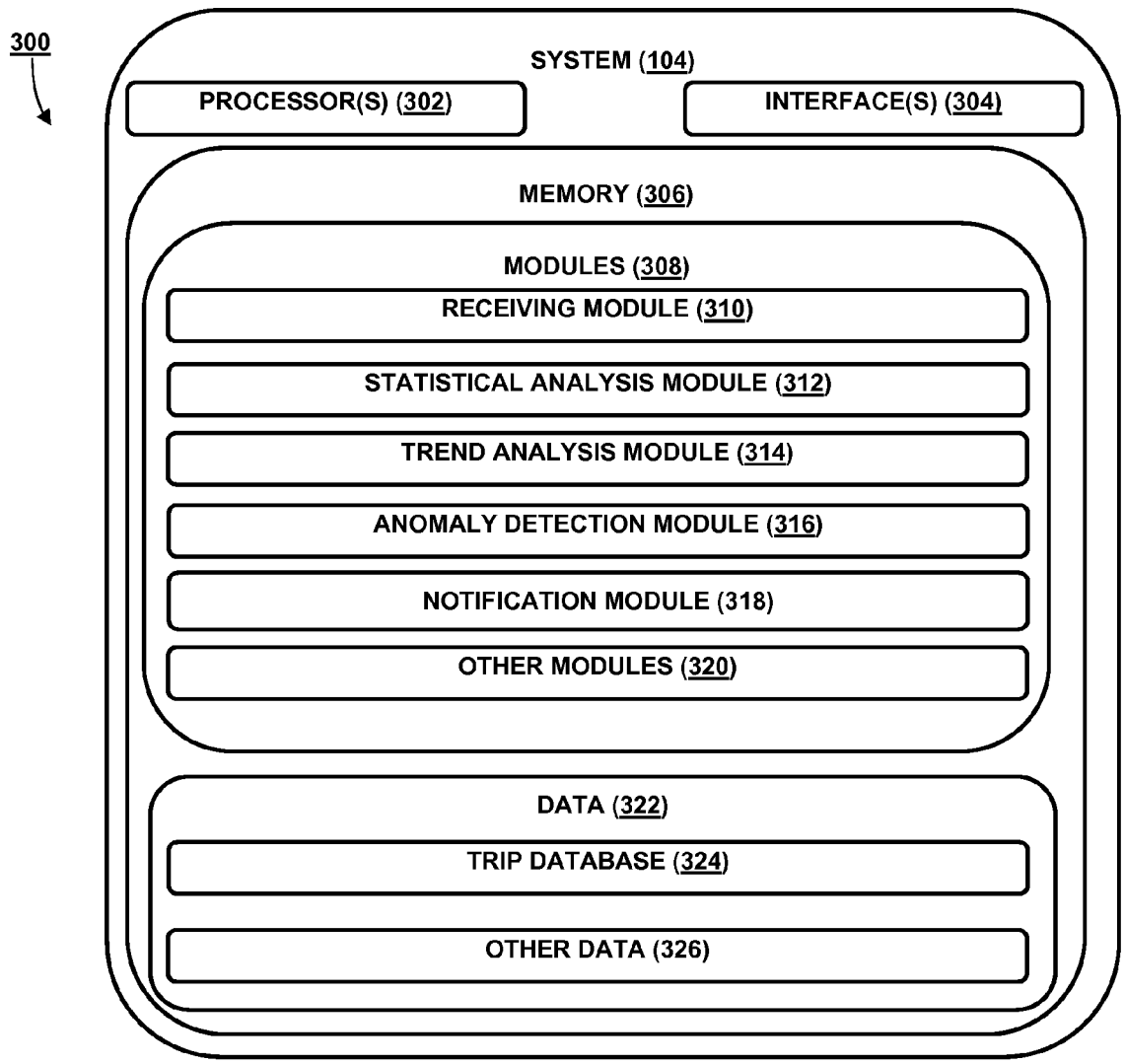
FIG. 3 illustrates one embodiment of the system 104 of FIG. 1.

Referring now to FIG. 3, a system 104 is illustrated in accordance with an embodiment of the present subject matter. In one embodiment, the system 104 may include a processor 302, an input/output (I/O) interface 304, and a memory 306. The processor 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute programmed instructions stored in the memory 306.

The I/O interface 304 may include a variety of software and hardware interfaces, for example, a web interface, a graphical user interface, and the like. The I/O interface 304 may allow the system 104 to interact with a device 102 and a monitoring terminal 108. Further, the I/O interface 304 may enable the system 104 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 322.

The modules 308 include routines, programs, objects, components, data structures, etc., which perform particular tasks or implement particular abstract data types. In one implementation, the modules 308 may include a receiving module 310, a statistical analysis module 312, a trend analysis module 314, an anomaly detection module 316, a notification module 318, and other modules 320. The other modules 320 may include programs or coded instructions that supplement applications and functions of the system 104.

The data 322, amongst other things, serves as a repository for storing data processed, received, and generated by one or more of the modules 308. The data 322 may also include a trip database 324, and other data 326. The other data 326 may include data generated as a result of the execution of one or more modules in the other modules 320.

Figure 4:
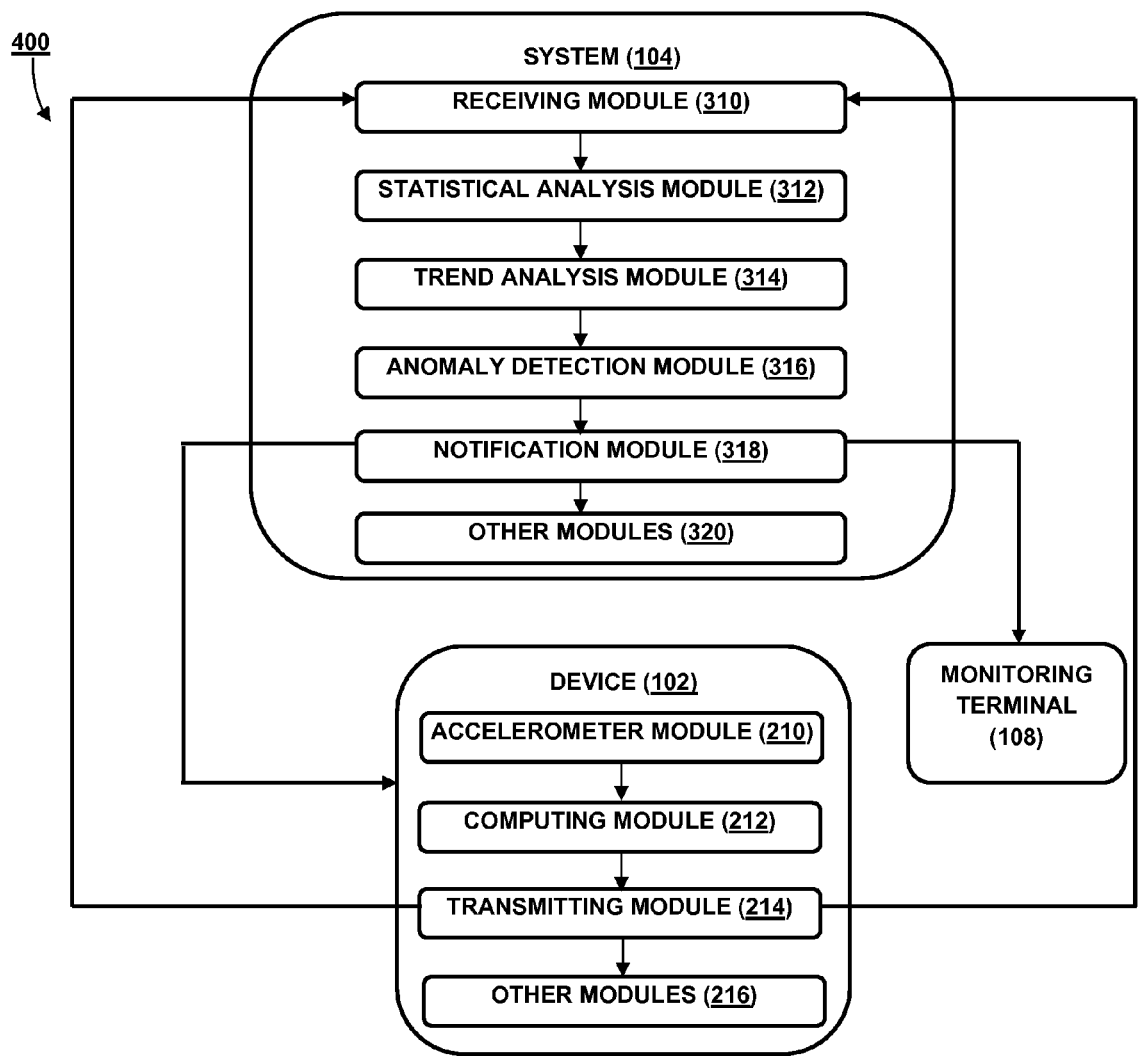
FIG. 4 illustrates a detail working of one embodiment of the device 102 and the system 104.

Referring to FIG. 4, one embodiment of a detailed working of components involved for detecting an anomaly associated with the driving of a vehicle is illustrated. The components involved may be a device 102 and a system 104. Further, another component may be a monitoring terminal 108. All the components may be connected over a network 106 as shown in FIG. 1. The present subject matter may be considered as one of an application of telematics technology where a vehicle data may be collected and transmitted to a centralized server (system 104 in the present case) for further analysis. According to the embodiments, it may be an objective to perform analysis on the vehicle data for identifying driving behavior in terms of a potential risk or anomalies associated with the driving of the vehicle 110. Further, the anomalies may be detected for a number of trips of the vehicle 110. Each trip may be associated with trip data, where the trip data may comprise a start-time of the trip, end-time of the trip, a source of the trip, and a destination of the trip. The trip data may be stored in a trip database 324 of the system 102. Further, the trip database 324 may be periodically updated or modified based on the analysis performed at the system 104. Thus, upon performing the analysis for detecting the anomalies associated with driving of the vehicle 110, a detected anomaly may be reported to a person driving the vehicle 110 or may be notified to a person monitoring the driving of the person driving the vehicle 110 through a notification system that may be in communication with the vehicle or a mobile device.

Thus, to perform the analysis for detecting the anomaly associated with the driving of the vehicle, the device 102 may initiate the process. The process may be initiated by an accelerometer module 210 of the device 102 when the vehicle 110 starts its trip from a source of a trip towards a destination of the trip. Simultaneously, with the start of the trip, a start-time of the trip may be noted and a timer may calculate the total time taken by the vehicle 110 from the source of the trip to the destination of the trip. In other embodiments, there may be other information associated with the trip data such as vehicle number/ID, and a route number. When the vehicle 110 starts moving from the source of the trip towards the destination of the trip, the accelerometer module 210 of the device 102, may be configured to determine Z-axis acceleration data of the vehicle 110 continuously in real-time for the trip. The Z-axis acceleration data may be an indicative of vertical vibrations of the vehicle 110. Here, the device 102 may be on-board diagnostic equipment (ODE) installed in the vehicle 110 or may be a mobile device such as a Smartphone, a laptop, or a notebook of a driver driving the vehicle 110.

The device 102 and/or system 104 may perform the anomaly detection by using only the Z-axis acceleration data rather than using the acceleration data for all the three axes data i.e., X-axis, Y-axis, and Z-axis of the vehicle 110. Thus, the present subject matter disclosed utilizes less memory for storing the acceleration data of the vehicle (i.e., only the Z-axis acceleration data), thereby increasing the computational speed of the system 104 for detecting the anomaly associated with the driving of the vehicle 110.

Further, the computing module 212 of the device 102 may be configured to compute jerk energies for the trip based on the Z-axis acceleration data determined. In one embodiment, the jerk energies may be computed in a following manner:

Let $a_1, a_2 \ldots a_n$ be the consecutive discrete acceleration samples (Z-axis acceleration data) at time $t_1, t_2 \ldots t_n$ for uniform sampling rate. Then jerk (m/sec$^3$) may be defined as:

$$J_i = \frac{a_{i+1} - a_i}{\Delta t} \text{ for } (1 \leq i \leq n-1) \qquad (1)$$

Here, n represents the total number of samples of the Z-axis acceleration data. Using the above equation (1), 'jerk energy' may be further defined as:

$$JE_s = J_{s1}^2 + J_{s2}^2 + \ldots + J_{s19}^2 \qquad (2)$$

Where, according to one example (shown in equation 2) $s_i$ represents the time window consisting of 20 samples of Z-axis acceleration data.

Thus, the jerk energies computed may be stored in a jerk energy database 220 of the device 102. Upon computing the jerk energies, a transmitting module 214 may be configured to transmit the jerk energies to the system 104, where at the system 104 the jerk energies may be processed for detection of the anomaly in the trip. The jerk energies may be computed and transmitted to the system 104 for the plurality of trips. Each trip of the plurality of trips may be associated with one or more trip data comprising start-time of the trip, end-time of the trip along with the jerk energies computed. Thus, different sets of jerk energies for each trip may be transmitted to the system 104 for analysis to detect the anomaly in the driving of the vehicle 110.

Now, for the detection of the anomaly in the trip, the functioning of various modules 308 of the system 104 may be explained in detail. The receiving module 310 of the system 104 may be configured to receive the jerk energies computed at the device 102 for the plurality of trips. Once the jerk energies are received, a hazard rate may be determined, wherein the hazard rate may indicate an anomaly in the driving of the vehicle 110. For determining the hazard rate, at first, a statistical analysis module 312 may be configured to perform statistical analysis on the jerk energies received.

The statistical analysis module 312 may perform the statistical analysis in the following manner. At first, a median and a mode parameter may be obtained from a data set of inverse of a jerk energy (JE) i.e., "1/JE=x". If the data set is multi-modal, a minimum value may be chosen. The value "x" (inverse of the jerk energy) may follow a Weibull distribution having k>1. The k may be considered as one statistical parameter i.e., a shape parameter obtained by the statistical analysis module 312. Along with the shape parameter "k", the statistical analysis module 312 may be further configured to obtain another statistical parameter i.e., a scale parameter ($\lambda$). Both of the statistical parameters may conform to the Weibull distribution. Further, the statistical analysis module 312 may be further configured to determine a percentile value ($X_{high}$) for the jerk energies. Thereafter, on basis of the statistical parameters (the shape parameter k and the scale parameter $\lambda$) obtained, and the percentile value ($X_{high}$) determined, the statistical analysis module 312 may be further configured for determining the hazard rate for the trip. In one embodiment, the hazard rate may be determined by using the statistical parameters and the percentile value $X_{high}$ in the following manner:

As it may be observed that for a typical drive, a histogram plot of the inverse of the jerk energy i.e., "1/Jerk Energy=x" follows the Weibull distribution which is shown below:

$$p(x) = \frac{k}{\lambda}\left(\frac{x}{\lambda}\right)^{k-1} \exp\left\{-\left(\frac{x}{\lambda}\right)^k\right\} \qquad (3)$$

Referring to the above equation 3, x represents the inverse of jerk energy already computed (equation 2). For each trip of the plurality of trips, there may be n number of jerk energy (JE) values which may be computed. In one example, it may be considered that in 1 minute of drive (a trip), 60 JE values may be computed. Thus, after deriving the median and mode of the data set of 1/JE values, the scale parameter ($\lambda$) and the shape parameter (k) may be computed (equation 3). Since 'x' denotes the jerk felt by the moving vehicle and each such abrupt change in acceleration leads to the progressive degradation of the system, the observed density distribution p(x) is treated as a Weibull Hazard Function given as:

$$h(x_{high}) = \frac{k}{\lambda}\left(\frac{x_{high}}{\lambda}\right)^{k-1} \qquad (4)$$

From the above equation 4, it may be considered that $X_{high}$ (the percentile value) may be an extreme value of the jerk felt by the moving vehicle 110. Once, the $h(X_{high})$ is determined, it may be further divided by a trip duration (time between the start-time of the trip and the end-time of the trip) to get a hazard rate per hour i.e., HPH. Thus, by normalizing the hazard rate with the trip duration, the HPH may be determined which may bring out a potential deficiency in driving behavior for the trip.

However, a single value of the HPH determined for the trip may not be considered enough for detecting the anomaly associated with the driving of the vehicle 110. Thus, to detect the anomaly, HPH may be required for the plurality of trips i.e., multiple HPHs may be required.

After determining the multiple HPH, a trend analysis module 314 may be configured to perform a trend analysis of the hazard rate of each trip of the plurality of trips. In one embodiment, the trend analysis module 314 may perform the trend analysis in a following manner. At first, the HPH for the plurality of trips may be processed to determine a mean-value, an upper-bound value, and a lower-bound value. Further, the trend analysis module 314 performs the trend analysis by observing the movement of the upper-bound value and the lower-bound value. Thus, based on the trend analysis performed, an anomaly detection module 316 may be configured to detect the anomaly associated with the driving of the vehicle 110.

In one embodiment, if the HPH measured for a trip is observed twice of the upper-bound value for the trip, the trip is designated anomalous in terms of driving of the vehicle 110. Further, the values such as the mean-value, the upper-bound value, and the lower-bound value may be considered for measuring a progressive degradation of the vehicle 110 in terms of suspension or absorber of the vehicle 110. The progressive degradation may be observed when the HPH band seems to be moving towards a higher value over the number of trips.

Thus, after detecting the anomaly associated with the driving of the vehicle 110, a notification module 318 of the system 104 may be configured to notify one or more persons about the anomaly detected. The notification may be sent to the device 102 and/or to a monitoring terminal 108. The one or more persons may be a driver driving the vehicle 110. The one or more persons may be a person associated with the monitoring terminal 108 for monitoring the driving behavior of the driver driving the vehicle 110. In another embodiment, the person associated with the monitoring terminal 108 may be an insurance manager or a fleet manager. Further, the insurance manager or the fleet manager may analyze the anomaly detected and is therefore notified about the driving behavior of the driver who may be driving the vehicle 110 for a particular trip. Also, the anomaly detected may be used in the insurance domain, i.e., for determining insurance coverage, generating insurance quotes, usage based insurance (UBI), etc.

Figure 5:
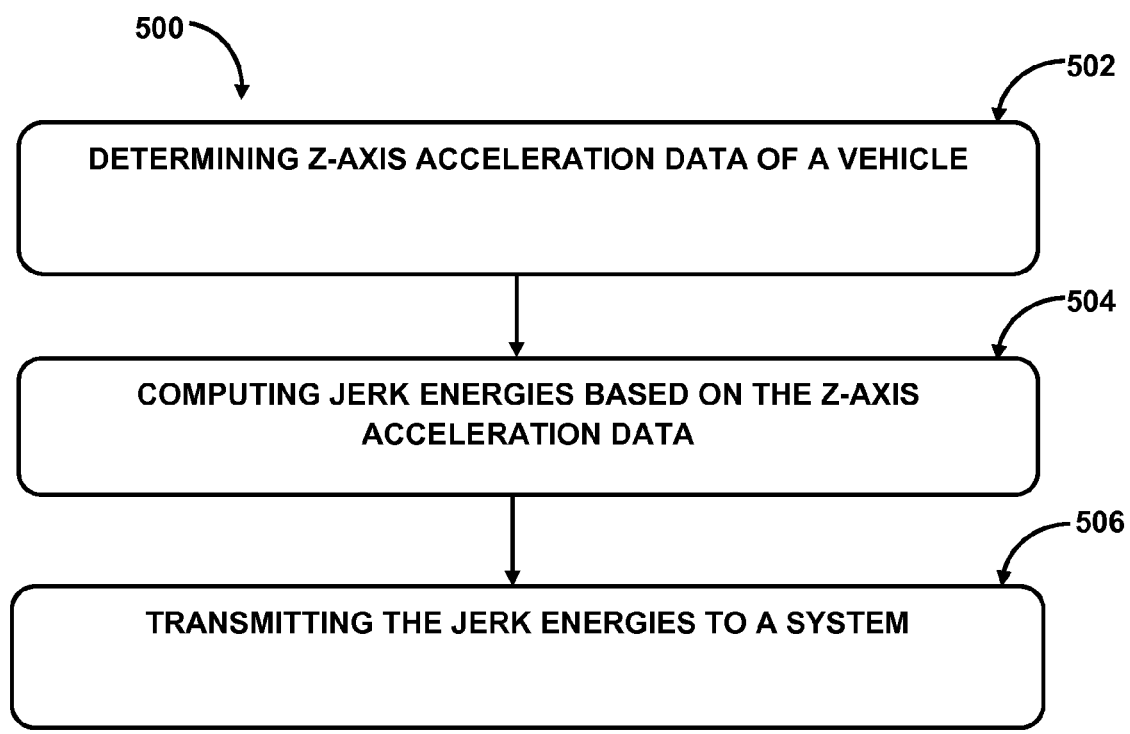
FIG. 5 illustrates a method for facilitating detection of an anomaly associated with the driving of a vehicle.

Referring now to FIG. 5, a method for facilitating detection of an anomaly associated with driving of a vehicle for a trip is shown. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combinations thereof. However, for ease of explanation, in the embodiments described below, the method 500 may be considered to be implemented in the above described device 102.

At block 502, Z-axis acceleration data of the vehicle 110 may be determined for a trip. The Z-axis acceleration data may be an indication of vertical vibrations of the vehicle 110.

At block 504, jerk energies are computed using the Z-axis acceleration data measured at block 502. Further, the jerk energies may be computed for each trip of a plurality of trips.

At block 506, the jerk energies computed may be transmitted to a system 104, where the jerk energies may be processed at the system 104 for detection of any anomalies in each trip of the plurality of trips.

Figure 6:
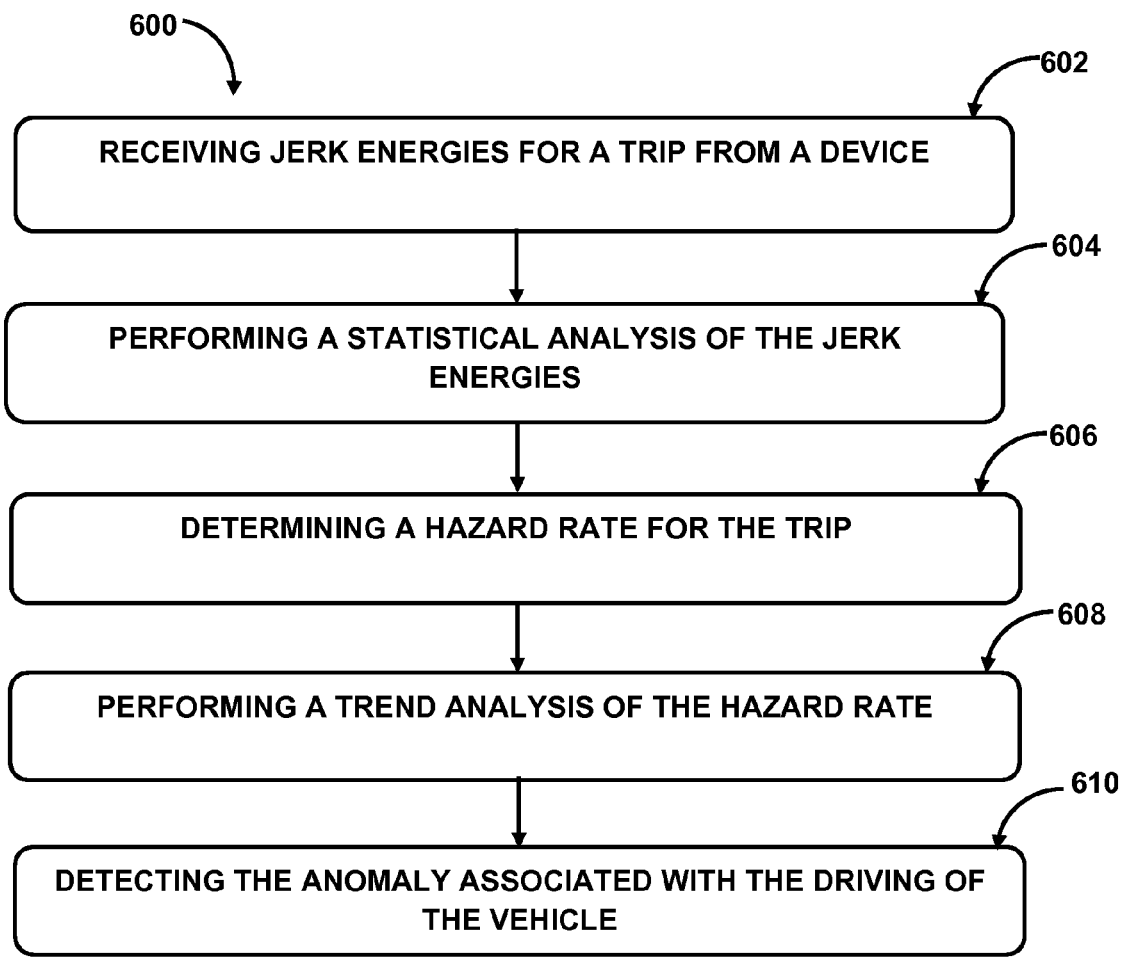
FIG. 6 illustrates a method for detecting an anomaly associated with the driving of a vehicle.

Referring now to FIG. 6, a method for detecting an anomaly associated with driving of a vehicle for a plurality of trips is shown. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combinations thereof. However, for ease of explanation, in the embodiments described below, the method 600 may be considered to be implemented in the above described system 104.

At block 602, jerk energies for a trip computed at a device 102 may be received.

At block 604, a statistical analysis may be performed on the jerk energies received. According to embodiments of present subject matter, the statistical analysis may be performed by obtaining one or more statistical parameters of jerk energies, where the statistical parameters may be a shape parameter (k) and a scale parameter ($\lambda$). Further, both the statistical parameters may conform to a Weibull distribution. Upon obtaining, another step of the statistical analysis may be performed for determining a percentile value ($X_{high}$) for the jerk energies.

At block 606, a hazard rate for the trip may be determined. Further, the hazard rate may be determined by using one or more statistical parameters (the shape parameter (k) and the scale parameter ($\lambda$)) and the percentile value ($X_{high}$). The hazard rate may be determined for each trip of the plurality of trips.

At block 608, a trend analysis may be performed for the hazard rate determined for each trip of the plurality of trips. In one embodiment, the trend analysis may be performed in the following manner. At first, the hazard rate for the plurality of trips may be processed to determine a mean-value, an upper-bound value, and a lower-bound value. Then, based on movement of the upper-bound value and the lower-bound value, the trend analysis may be performed.

At block 610, the anomaly associated with the driving of the vehicle may be detected based on the trend analysis performed at the block 608. Further, the anomaly detected may be notified to a person associated with the device 102 or a monitoring terminal 108. According to one aspect, the person associated with the device 102 may be a driver who is driving the vehicle 110. According to another aspect, the person associated with the monitoring terminal 108 may be a person monitoring the driving behavior of the driver driving the vehicle 110.

ADVANTAGES

The system 104 is enabled for detecting an anomaly associated with driving of the vehicle by using only Z-axis acceleration data of the vehicle.

The system 104 provides reduction in the computational time which may be required for detecting the anomaly in driving behavior.

Although implementations for methods and systems for detecting an anomaly associated with driving of the vehicle have been described in language specific to structural features and/or methods, it is to be understood that the appended claims are not necessarily limited to the specific features or methods described. Rather, the specific features and methods are disclosed as examples of implementations for detecting an anomaly associated with driving of a vehicle for a plurality of trips.

What is claimed is:

1. A system for detecting an anomaly associated with driving of a vehicle for a plurality of trips, the system comprising:
    a processor; and
    a memory coupled to the processor, wherein the memory has a plurality of modules stored therein that are executable by the processor, the plurality of modules comprising:
        a receiving module configured to receive jerk energies for a trip of the plurality of trips from a device computing the jerk energies;
        a statistical analysis module coupled to the receiving module to receive the jerk energies therefrom, wherein the statistical analysis module performs a statistical analysis of the jerk energies and determines a hazard rate for the trip based upon the statistical analysis;
        a trend analysis module coupled to the statistical analysis module to receive the hazard rate for the trip, wherein the trend analysis module performs a trend analysis of the hazard rate of each trip of the plurality of trips; and
        an anomaly detection module coupled to the trend analysis module to receive the trend analysis, wherein the anomaly detection module detects any anomaly associated with the driving of the vehicle based on the trend analysis.

2. The system of claim 1, wherein the statistical analysis module determines the hazard rate using the one or more statistical parameters and the percentile value.

3. The system of claim 1, wherein the statistical analysis module performs the statistical analysis by:
    obtaining one or more statistical parameters of the jerk energies, wherein the statistical parameters comprises a shape parameter (k) and a scale parameter ($\lambda$), and wherein the shape parameter (k) and the scale parameter ($\lambda$) each conform to a Weibull distribution; and
    determining a percentile value ($X_{high}$) for the jerk energies.

4. The system of claim 1, wherein the trend analysis module performs the trend analysis by:
    processing the hazard rate of each trip of the plurality of trips;
    determining a mean-value, an upper-bound value, and a lower-bound value based on the processing of the hazard rate of the plurality of trips; and
    performing the trend analysis based upon the upper-bound value and the lower-bound value of the hazard rate of the plurality of trips.

5. The system of claim 3, wherein the statistical analysis module determines the hazard rate using the one or more statistical parameters and the percentile value.

6. The system of claim 3, further comprising a notification module coupled to the anomaly detection module to receive a signal indicative of the presence of an anomaly and configured to notify a person about the anomaly associated with the vehicle, wherein the person may be any one of a driver driving the vehicle and a person monitoring the driving of the vehicle through a monitoring terminal.

7. A method for detecting an anomaly associated with driving of a vehicle for a plurality of trips, the method comprising:
    receiving, by a processor, jerk energies for a trip of plurality of trips from a device computing the jerk energies;
    performing, by a processor, a statistical analysis of the jerk energies to determine a hazard rate for the trip based upon the statistical analysis;
    performing, by the processor, a trend analysis of the hazard rate for each trip of the plurality of trips; and
    detecting, by the processor, any anomaly associated with the driving of the vehicle based on the trend analysis.

8. The method for claim 7, wherein the performing the statistical analysis comprises:
    obtaining one or more statistical parameters of jerk energies, wherein the statistical parameters comprises a shape parameter (k) and a scale parameter ($\lambda$), and wherein the shape parameter (k) and the scale parameter ($\lambda$) are conform to a Weibull distribution; and
    determining a percentile value ($X_{high}$) for the jerk energies.

9. The method of claim 7, wherein the performing the trend analysis comprises:
    processing the hazard rate of each trip of the plurality of trips;
    determining a mean-value, an upper-bound value, and a lower-bound value based on the processing of the hazard rate of the plurality of trips; and
    performing the trend analysis based upon the upper-bound value and the lower-bound value of the hazard rate of the plurality of trips.

10. The method of claim 8, wherein the determination of the hazard rate is performed using the one or more statistical parameters and the percentile value.

* * * * *